(12) United States Patent
Kieselbach

(10) Patent No.: US 8,375,330 B2
(45) Date of Patent: Feb. 12, 2013

(54) TASK IMPORTANCE INDICATOR BASED ON PERSONALIZED RULES

(75) Inventor: Oliver Kieselbach, Bielefeld (DE)

(73) Assignee: SAP AG, Walldorf (DE)

(*) Notice: Subject to any disclaimer, the term of this patent is extended or adjusted under 35 U.S.C. 154(b) by 338 days.

(21) Appl. No.: 12/868,326

(22) Filed: Aug. 25, 2010

(65) Prior Publication Data

US 2012/0054662 A1  Mar. 1, 2012

(51) Int. Cl.
*G06F 3/048* (2006.01)
(52) U.S. Cl. ....... 715/835; 715/765; 715/772; 705/7.11; 705/7.15
(58) Field of Classification Search ............ 715/751, 715/752, 753, 764, 765, 772, 835, 846; 705/7.11, 705/7.13, 7.15
See application file for complete search history.

(56) References Cited

U.S. PATENT DOCUMENTS

| | | | | |
|---|---|---|---|---|
| 7,222,156 | B2 * | 5/2007 | Gupta et al. | 709/206 |
| 8,024,415 | B2 * | 9/2011 | Horvitz et al. | 709/207 |
| 8,239,291 | B2 * | 8/2012 | Hoffman et al. | 705/28 |
| 2003/0137541 | A1 * | 7/2003 | Massengale et al. | 345/764 |
| 2005/0108074 | A1 * | 5/2005 | Bloechl et al. | 705/8 |
| 2007/0113191 | A1 * | 5/2007 | Keller et al. | 715/752 |
| 2010/0332271 | A1 * | 12/2010 | De Spong | 705/7 |

OTHER PUBLICATIONS

Rules—Outlook—Microsoft Office [online] "Support / Outlook/ 2010 Help and How-to RULES" [retrieved from the Internet Aug. 25, 2010] <URL: http://office.microsoft.com/en-us/outlook-help/CH010372738.aspx>.

* cited by examiner

*Primary Examiner* — Xiomar L Bautista
(74) *Attorney, Agent, or Firm* — Fish & Richardson P.C.

(57) ABSTRACT

The present disclosure involves systems, software, and computer implemented methods for providing an indicator of a relative importance of a work item. One process includes operations for identifying at least one work item for determining a relative importance of the work item. A context of a user associated with the work item is determined, and a plurality of attributes of the work item are identified. At least one applicable rule is also identified from a set of rules specific to the user. A score for the work item is calculated based on an application of the at least one applicable rule to the context of the user and the plurality of attributes of the work item, the score representing the relative importance of the work item. An indicator of the relative importance of the work item is presented through a user interface.

20 Claims, 3 Drawing Sheets

| SENDER | DATE | SUBJECT | IMPORTANCE | |
|---|---|---|---|---|
| JOHN | AUGUST 1 | TASK A | ☐ | 308a |
| BOB | AUGUST 2 | TASK B | ▨ | 308b |
| SALLY | AUGUST 1 | TASK C | ▦ | 308c |

TASK IMPORTANCE INDICATOR BASED ON PERSONALIZED RULES

TECHNICAL FIELD

The present disclosure relates to software, computer systems, and computer implemented methods for providing an indicator of a relative importance of a work item based on personalized rules.

BACKGROUND

Task items such as e-mails may be associated with varying degrees of importance in a business context. A user in a particular role, for example, may manually tag certain task items as having higher priority or importance than other task items. The task items may be categorized as having High, Medium, or Low priority, for example. The categories of the task items may be static indicators of the importance of the task item as established by a user. The categories may indicate a general characterization of the associated task items without regard to a particular context of the task items or the user of the task items. Task items, however, may need to be categorized or ranked with respect to other relevant task items and to a particular context associated with the task items and the user.

SUMMARY

The present disclosure describes techniques for providing an indicator of a relative importance of a work item based on personalized rules. A computer program product is encoded on a tangible storage medium, where the product comprises computer readable instructions for causing one or more processors to perform operations. These operations can include identifying at least one work item for determining a relative importance of the work item. A context of a user associated with the work item is determined, and a plurality of attributes of the work item are identified. At least one applicable rule is also identified from a set of rules specific to the user. A score for the work item is calculated based on an application of the at least one applicable rule to the context of the user and the plurality of attributes of the work item, the score representing the relative importance of the work item. An indicator of the relative importance of the work item is presented through a user interface.

While generally described as computer implemented software embodied on tangible media that processes and transforms the respective data, some or all of the aspects may be computer implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DETAILED DESCRIPTION

Figure 1:
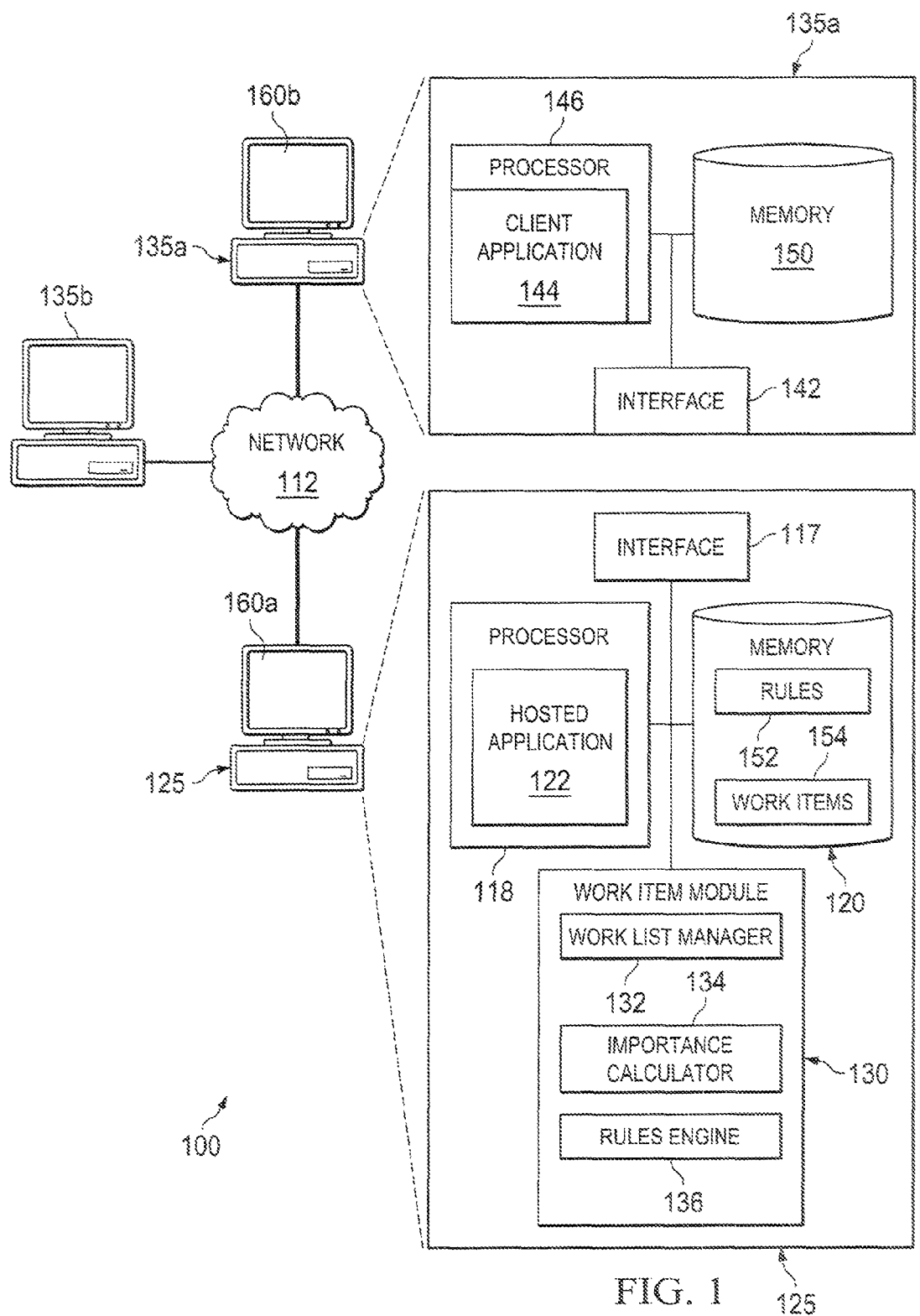
FIG. 1 illustrates an example environment for providing a work item service for presenting an indicator of relative importance of work items.

This disclosure generally describes computer systems, software, and computer implemented methods for providing an indicator of a relative importance of a work item based on personalized rules. Users may access or view work items through a user interface or a particular application. The work items may be arranged in a list and presented to a user with an indication of the importance of a particular work item. For example, the work items may be presented in a particular order, and the ordering of the work items may be based on various fixed factors such as the order in which the work items were received or assigned, a creation date of the work item, a user-defined importance of each work item, or other metric of importance of the work items. The work items may also be labeled as having high or low importance, providing the user with a general idea of the work items that may require more immediate attention than other work items.

In some implementations, the work items can be associated with different importance levels with respect to other work items for a particular user. For example, a particular user may have a number of work items assigned to the user, and the importance of each work item may be determined relative to the other work items assigned to the user. Further, the importance of the work items may be determined based on a context of the work item or user. The role of the user in a business organization or in a certain business context, the originator of the work item, the subject matter of the work item, the deadlines associated with the work item, or any other factor may affect the relative importance of each work item. Further, users may have personal settings or rules specific to the user or the work items, and values representing the importance of each work item with respect to the other work items may be calculated based on the personal settings or rules. Thus, the user may be informed of the relative importance of each work item in a particular context with respect to other work items of the user. In certain implementations, an importance or relevance indicator may be used to display the importance of a particular work item through a user interface.

One potential benefit of determining the relevance and importance of work items based on user context is that users may identify work items of higher importance relative to other work items for a particular task or context, allowing the user to work more efficiently. The user may be able to handle incoming tasks based on different, flexible rules and a range of attributes associated with the user's particular role, context, or personal settings. Instead of identifying important work items based merely on fixed attributes such as a certain date associated with a work item, the work item importance indicator of the present disclosure may account for different scenarios when determining which work items are more important than other work items, and certain work items may be labeled as having higher importance based on personal preferences of the user or a role of the user in a business organization, for example. A work item manager may be implemented to sort work items for a user based on relative priority or importance of the work items. Further, a user interface may provide indicators of relative importance for each work item associated with a user. Still further, in some implementations, system agents can scan work items to determine a relative importance for each work item and perform tasks based on the importance of the work items. For example, system agents can group, filter, categorize, or move work items based on an importance indicator of a work item. System agents may also provide users with notifications, such as reminders for due dates or other actions, associated with a work item based on the importance of the work item.

Turning to the illustrated example, FIG. 1 illustrates an example environment 100 for providing a work item service for presenting an indicator of relative importance of work items. The illustrated environment 100 includes or is communicably coupled with one or more clients 135 or servers 125, at least some of which communicate across network 112. In general, environment 100 depicts an example configuration of a system capable of determining and presenting an indicator of relative importance of work items based on a particular context of a user. In some implementations, the importance indicator of the present disclosure may be implemented as a hosted application on a server, such as server 125, accessible to a user at client 135a through a network 112. In certain instances, clients 135a-b and server 125 can be logically grouped and accessible within a cloud computing network. Accordingly, the service for providing an importance indicator may be provided to a user of client 135 as an on-demand solution through the cloud computing network as well as a traditional server-client system or a local application at client 135a. Alternatively, the work item service may be provided through a traditional server-client implementation or locally at client 135a without the need for accessing a hosted application through network 112.

In general, server 125 is any server that stores one or more hosted applications 122, where at least a portion of the hosted applications are executed via requests and responses sent to users or clients within and communicably coupled to the illustrated environment 100 of FIG. 1. For example, server 125 may be a Java 2 Platform, Enterprise Edition (J2EE)-compliant application server that includes Java technologies such as Enterprise JavaBeans (EJB), J2EE Connector Architecture (JCA), Java Messaging Service (JMS), Java Naming and Directory Interface (JNDI), and Java Database Connectivity (JDBC). In some instances, the server 125 may store a plurality of various hosted applications 122, while in other instances, the server 125 may be a dedicated server meant to store and execute only a single hosted application 122. In some instances, the server 125 may comprise a web server or be communicably coupled with a web server, where the hosted applications 122 represent one or more web-based applications accessed and executed via network 112 by clients 135 of the system to perform the programmed tasks or operations of the hosted application 122.

At a high level, the server 125 comprises an electronic computing device operable to receive, transmit, process, store, or manage data and information associated with the environment 100. The server 125 illustrated in FIG. 1 can be responsible for receiving application requests from one or more client applications or business applications associated with clients 135 of environment 100 and responding to the received requests by processing said requests in the associated hosted application 122, and sending the appropriate response from the hosted application 122 back to the requesting client application. The server 125 may also receive requests and respond to requests from other components on network 112. Alternatively, the hosted application 122 at server 125 can be capable of processing and responding to local requests from a user accessing server 125 locally. Accordingly, in addition to requests from the external clients 135 illustrated in FIG. 1, requests associated with the hosted applications 122 may also be sent from internal users, external or third-party customers, other automated applications, as well as any other appropriate entities, individuals, systems, or computers. Further, the terms "client application" and "business application" may be used interchangeably as appropriate without departing from the scope of this disclosure.

As used in the present disclosure, the term "computer" is intended to encompass any suitable processing device. For example, although FIG. 1 illustrates a single server 125, environment 100 can be implemented using one or more servers 125, as well as computers other than servers, including a server pool. Indeed, server 125 and client 135 may be any computer or processing device such as, for example, a blade server, general-purpose personal computer (PC), Macintosh, workstation, UNIX-based workstation, or any other suitable device. In other words, the present disclosure contemplates computers other than general purpose computers, as well as computers without conventional operating systems. Further, illustrated server 125 and client 135 may be adapted to execute any operating system, including Linux, UNIX, Windows, Mac OS, or any other suitable operating system. According to one embodiment, server 125 may also include or be communicably coupled with a mail server.

In the present implementation, and as shown in FIG. 1, the server 125 includes a processor 118, an interface 117, a memory 120, and one or more hosted applications 122. The interface 117 is used by the server 125 for communicating with other systems in a client-server or other distributed environment (including within environment 100) connected to the network 112 (e.g., clients 135, as well as other systems communicably coupled to the network 112). Generally, the interface 117 comprises logic encoded in software and/or hardware in a suitable combination and operable to communicate with the network 112. More specifically, the interface 117 may comprise software supporting one or more communication protocols associated with communications such that the network 112 or interface's hardware is operable to communicate physical signals within and outside of the illustrated environment 100.

The server 125 may also include a user interface, such as a graphical user interface (GUI) 160a. The GUI 160a comprises a graphical user interface operable to, for example, allow the user of the server 125 to interface with at least a portion of the platform for any suitable purpose, such as creating, preparing, requesting, or analyzing data, as well as viewing and accessing source documents associated with business transactions. Generally, the GUI 160a provides the particular user with an efficient and user-friendly presentation of business data provided by or communicated within the system. The GUI 160a may comprise a plurality of customizable frames or views having interactive fields, pull-down lists, and buttons operated by the user. For example, GUI 160a may provide interactive elements that allow a user to select from a list of suggested entries for input into a data field displayed in GUI 160a. More generally, GUI 160a may also provide general interactive elements that allow a user to access and utilize various services and functions of application 122. The GUI 160a is often configurable, supports a combination of tables and graphs (bar, line, pie, status dials, etc.), and is able to build real-time portals, where tabs are delineated by key characteristics (e.g. site or micro-site). Therefore, the GUI 160a contemplates any suitable graphical user interface, such as a combination of a generic web browser, intelligent engine, and command line interface (CLI) that processes information in the platform and efficiently presents the results to the user visually.

Generally, example server 125 may be communicably coupled with a network 112 that facilitates wireless or wireline communications between the components of the environment 100 (i.e., between the server 125 and clients 135), as well as with any other local or remote computer, such as additional clients, servers, or other devices communicably coupled to network 112 but not illustrated in FIG. 1. In the illustrated environment, the network 112 is depicted as a single network in FIG. 1, but may be a continuous or discontinuous network without departing from the scope of this disclosure, so long as at least a portion of the network 112 may facilitate communications between senders and recipients. The network 112 may be all or a portion of an enterprise or secured network, while in another instance at least a portion of the network 112 may represent a connection to the Internet. In some instances, a portion of the network 112 may be a virtual private network (VPN), such as, for example, the connection between the client 135 and the server 125. Further, all or a portion of the network 112 can comprise either a wireline or wireless link. Example wireless links may include 802.11a/b/g/n, 802.20, WiMax, and/or any other appropriate wireless link. In other words, the network 112 encompasses any internal or external network, networks, sub-network, or combination thereof operable to facilitate communications between various computing components inside and outside the illustrated environment 100. The network 112 may communicate, for example, Internet Protocol (IP) packets, Frame Relay frames, Asynchronous Transfer Mode (ATM) cells, voice, video, data, and other suitable information between network addresses. The network 112 may also include one or more local area networks (LANs), radio access networks (RANs), metropolitan area networks (MANs), wide area networks (WANs), all or a portion of the Internet, and/or any other communication system or systems at one or more locations. The network 112, however, is not a required component of the present disclosure, and the elements hosted by the server 125, such as the work item module 130, may be implemented locally at a client 135 or locally at server 125.

Clients 135*a-b* may have access to resources such as server 125 within network 112. In certain implementations, the servers within the network 112, including server 125 in some instances, may comprise a cloud computing platform for providing cloud-based services. The terms "cloud," "cloud computing," and "cloud-based" may be used interchangeably as appropriate without departing from the scope of this disclosure. Cloud-based services can be hosted services that are provided by servers and delivered across a network to a client platform to enhance, supplement, or replace applications executed locally on a client computer. Clients 135*a-b* can use cloud-based services to quickly receive software upgrades, applications, and other resources that would otherwise require a lengthy period of time before the resources can be delivered to the clients 135*a-b*. Additionally, other devices may also have access to cloud-based services, such as on-demand services provided by servers accessible through network 112.

As described in the present disclosure, on-demand services can include multiple types of services such as products, actionable analytics, enterprise portals, managed web content, composite applications, or capabilities for creating, integrating, using and presenting business applications. For example, a cloud-based implementation can allow client 135 to transparently upgrade from an older user interface platform to newer releases of the platform without loss of functionality. In certain implementations, a work item service can provide indicators of relative importance of work items based on a context of a user and the importance of each work item relative to other work items associated with the user. For example, the work item service may calculate values representing a context-based importance of each work item based on a role of a user or certain attributes found in the work items. The work items may then be arranged in a particular order or may be associated with a visual indication of relative importance.

As illustrated in FIG. 1, server 125 includes a processor 118. Although illustrated as a single processor 118 in FIG. 1, two or more processors may be used according to particular needs, desires, or particular embodiments of environment 100. Each processor 118 may be a central processing unit (CPU), a blade, an application specific integrated circuit (ASIC), a field-programmable gate array (FPGA), or another suitable component. Generally, the processor 118 executes instructions and manipulates data to perform the operations of server 125 and, specifically, the one or more plurality of hosted applications 122. Specifically, the server's processor 118 executes the functionality required to receive and respond to requests from the clients 135*a-b* and their respective client applications 144, as well as the functionality required to perform the other operations of the hosted application 122.

Regardless of the particular implementation, "software" may include computer-readable instructions, firmware, wired or programmed hardware, or any combination thereof on a tangible medium operable when executed to perform at least the processes and operations described herein. Indeed, each software component may be fully or partially written or described in any appropriate computer language including C, C++, Java, Visual Basic, assembler, Perl, any suitable version of 4GL, as well as others. It will be understood that while portions of the software illustrated in FIG. 1 are shown as individual modules that implement the various features and functionality through various objects, methods, or other processes, the software may instead include a number of sub-modules, third party services, components, libraries, and such, as appropriate. Conversely, the features and functionality of various components can be combined into single components as appropriate. In the illustrated environment 100, processor 118 executes one or more hosted applications 122 on the server 125.

At a high level, each of the one or more hosted applications 122 is any application, program, module, process, or other software that may execute, change, delete, generate, or otherwise manage information according to the present disclosure, particularly in response to and in connection with one or more requests received from the illustrated clients 135*a-b* and their associated client applications 144 or from other servers or components through a network 112. In certain cases, only one hosted application 122 may be located at a particular server 125. In others, a plurality of related and/or unrelated hosted applications 122 may be stored at a single server 125, or located across a plurality of other servers 125, as well. In certain cases, environment 100 may implement a composite hosted application 122. For example, portions of the composite application may be implemented as Enterprise Java Beans (EJBs) or design-time components may have the ability to generate run-time implementations into different platforms, such as J2EE (Java 2 Platform, Enterprise Edition), ABAP (Advanced Business Application Programming) objects, or Microsoft's .NET, among others. Additionally, the hosted applications 122 may represent web-based applications accessed and executed by remote clients 135*a-b* or client applications 144 via the network 112 (e.g., through the Internet). Further, while illustrated as internal to server 125, one or more processes associated with a particular hosted application 122 may be stored, referenced, or executed remotely. For example, a portion of a particular hosted application 122 may be a web service associated with the application that is remotely called, while another portion of the hosted application 122 may be an interface object or agent bundled for processing at a remote client 135. Moreover, any or all of the hosted applications 122 may be a child or sub-module of another software module or enterprise application (not illustrated) without departing from the scope of this disclosure. Still further, portions of the hosted application 122 may be executed by a user working directly at server 125, as well as remotely at client 135.

As illustrated, processor 118 can also execute a work item module 130 that provides services for applications such as hosted application 122, client application 144, or clients 135 within network 112. In some implementations, the work item module 130 can be executed by a different processor or server external to server 125, such as by a server communicably coupled to server 125 through network 112. For example, the work item module 130 may be provided as an on-demand service through a cloud computing network, as a web service accessible via network 112, or as a service provided on a dedicated server. The work item module 130 can provide interfaces, modules, services, or metadata definitions that enable hosted application 122 or client application 144 to determine the context-based relevance or importance of work items for a particular user and present an indicator of the importance of the work items through a user interface. The work items may be data objects 154 representing work tasks or communications associated with a particular user and stored in a database such as memory 120. The work items 154 may include e-mails or other data objects that the particular user may need to review or process in connection with a business context, for example. The particular business context associated with the work items 154 may determine the order in which the user needs to handle the work items 154. In other words, certain work items may have higher or lower importance relative to other work items, depending on different factors such as, for example, a role of the user within the business context or other attributes associated with each work item.

The work item module 130 may provide services for identifying the importance of each work item relative to other work items. For example, a value may be calculated and attributed to each work item based on various rules 152 associated with a particular user or the user's business context. In some implementations, the rules 152 may be predefined rules selected by the user indicating the preferences of the user. Alternatively, the rules 152 may also include rules generated in response to actions performed by the user reflecting certain preferences of the user. For example, a learning mechanism may be implemented to dynamically update the rules 152 as additional information is learned about a particular user through analysis of the user's actions and responses. The user may also, in some instances, have the option of modifying the rules 152 or selecting different rules 152 in accordance with the user's preferences.

Each rule may be a parameter defining the importance or weight given to certain conditions of a particular business context. For example, a rule may designate certain values to be assigned to work items based on the number of assignees associated with the work item. In some instances, the fewer the number of assignees associated with the work item, the more important the work item is. A rule may also designate work items of particular types or work items belonging to certain process templates as having greater importance. Further, the rules may be dynamic and flexible, changing and adapting to different scenarios as a user changes tasks or roles within the business organization. For example, a user associated with a first role in an organization may have preferences defined by a first set of rules while the same user associated with a different role may have different preferences defined by a second set of rules. Still further, the rules applicable to the user may change based on the session or project of the user, changes in priority based on changes in personnel or lapse of time, or any other factors impacting priority of tasks for a particular user within a particular context.

In some implementations, the work item module 130 may utilize other services or components to determine the relative importance of work items. A work list manager 132 may be used to handle incoming and outgoing work items as well as arrange, process, and present work items in a work list, for example. The work list manager may also 132 utilize an importance calculator 134 for determining a relative importance of a work item. The importance calculator 134 can generate a score for each work item by assigning numerical values to the score for each attribute of a work item considered to be important to a user in a given context. The scores generated by the importance calculator 134 may also be based on a set of rules 152 specific to a user. In general, the set of rules includes rules that define which attributes of the user context or the work items are applicable to determining the importance of the work item in a certain scenario, how the attributes affect the importance of a work item, and the different scenarios in which different attributes may affect the importance of a work item. A rules engine component 136 may be used to determine which rules are applicable to a particular context of the user. Although the different components within work item module 130 are illustrated as separate modules in FIG. 1, the different components may be implemented as separate modules external to work item module 130 or as combined modules in any arrangement.

In general, the server 125 also includes memory 120 for storing data and program instructions. Memory 120 may include any memory or database module and may take the form of volatile or non-volatile memory including, without limitation, magnetic media, optical media, random access memory (RAM), read-only memory (ROM), removable media, or any other suitable local or remote memory component. Memory 120 may store various objects or data, including classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the server 125 and its one or more hosted applications 122.

Memory 120 may also store data objects such as work items 154 associated with one or more users. The work items 154 may be task items or communications such as e-mails, for example, received by or assigned to a particular user. The work item module 130 may arrange the work items 154 in a particular order or present an indication of the relative importance of each work item 154 with respect to other work items so that the user can efficiently review, process, and handle the work items 154. The determination of the importance of a particular work item may be based on a set of rules 152, which may also be stored in memory 120. The set of rules 152 may apply to a particular user and may be used by work item module 130 to determine the important work items 154 in a given business context for the user.

The illustrated environment of FIG. 1 also includes one or more clients 135. Each client 135 may be any computing device operable to connect to or communicate with at least the server 125 and/or via the network 112 using a wireline or wireless connection. Further, as illustrated in FIG. 1, client 135a includes a processor 146, an interface 142, a graphical user interface (GUI) 160b, a client application 144, and a memory 150. In general, client 135a comprises an electronic computer device operable to receive, transmit, process, and store any appropriate data associated with the environment 100 of FIG. 1. It will be understood that there may be any number of clients 135 associated with, or external to, environment 100. For example, while illustrated environment 100 includes client 135a, alternative implementations of environment 100 may include multiple clients communicably coupled to the server 125, or any other number of clients suitable to the purposes of the environment 100. Additionally, there may also be one or more additional clients 135 external to the illustrated portion of environment 100 that are capable of interacting with the environment 100 via the network 112. Further, the term "client" and "user" may be used interchangeably as appropriate without departing from the scope of this disclosure. The term "client" may also refer to any computer, application, or device, such as a mobile device, that is communicably coupled to one or more servers through a network 112. Moreover, while each client 135 is described in terms of being used by a single user, this disclosure contemplates that many users may use one computer, or that one user may use multiple computers.

The GUI 160b associated with client 135a comprises a graphical user interface operable to, for example, allow the user of client 135a to interface with at least a portion of the platform for any suitable purpose, such as creating, preparing, requesting, or analyzing data, as well as viewing and accessing source documents associated with business transactions. Generally, the GUI 160b provides the particular user with an efficient and user-friendly presentation of business data provided by or communicated within the system. The GUI 160b may comprise a plurality of customizable frames or views having interactive fields, pull-down lists, and buttons operated by the user. In particular, GUI 160b may display a visual representation of work items 154 to a user and present a visual indicator of the relative importance of the work items 154 based on a particular business context of the user. More generally, GUI 160b may also provide general interactive elements that allow a user to access and utilize various services and functions of application 144. The GUI 160b is often configurable, supports a combination of tables and graphs (bar, line, pie, status dials, etc.), and is able to build real-time portals, where tabs are delineated by key characteristics (e.g. site or micro-site). Therefore, the GUI 160b contemplates any suitable graphical user interface, such as a combination of a generic web browser, intelligent engine, and command line interface (CLI) that processes information in the platform and efficiently presents the results to the user visually.

As used in this disclosure, client 135 is intended to encompass a personal computer, touch screen terminal, workstation, network computer, kiosk, wireless data port, smart phone, personal data assistant (PDA), one or more processors within these or other devices, or any other suitable processing device. For example, each client 135 may comprise a computer that includes an input device, such as a keypad, touch screen, mouse, or other device that can accept user information, and an output device that conveys information associated with the operation of the server 125 (and hosted application 122) or the client 135 itself, including digital data, visual information, the client application 144, or the GUI 160b. Both the input and output device may include fixed or removable storage media such as a magnetic storage media, CD-ROM, or other suitable media to both receive input from and provide output to users of client 135 through the display, namely, the GUI 160b.

While FIG. 1 is described as containing or being associated with a plurality of elements, not all elements illustrated within environment 100 of FIG. 1 may be utilized in each alternative implementation of the present disclosure. For example, although FIG. 1 depicts a server-client environment implementing a hosted application at server 125 that can be accessed by client computer 135, in some implementations, server 125 executes a local application that features an application UI accessible to a user directly utilizing GUI 160a. Further, although FIG. 1 depicts a server 125 external to network 112, server 125 may be included within the network 112 as part of an on-demand context solution, for example. Additionally, one or more of the elements described herein may be located external to environment 100, while in other instances, certain elements may be included within or as a portion of one or more of the other described elements, as well as other elements not described in the illustrated implementation. Further, certain elements illustrated in FIG. 1 may be combined with other components, as well as used for alternative or additional purposes in addition to those purposes described herein.

Figure 2:
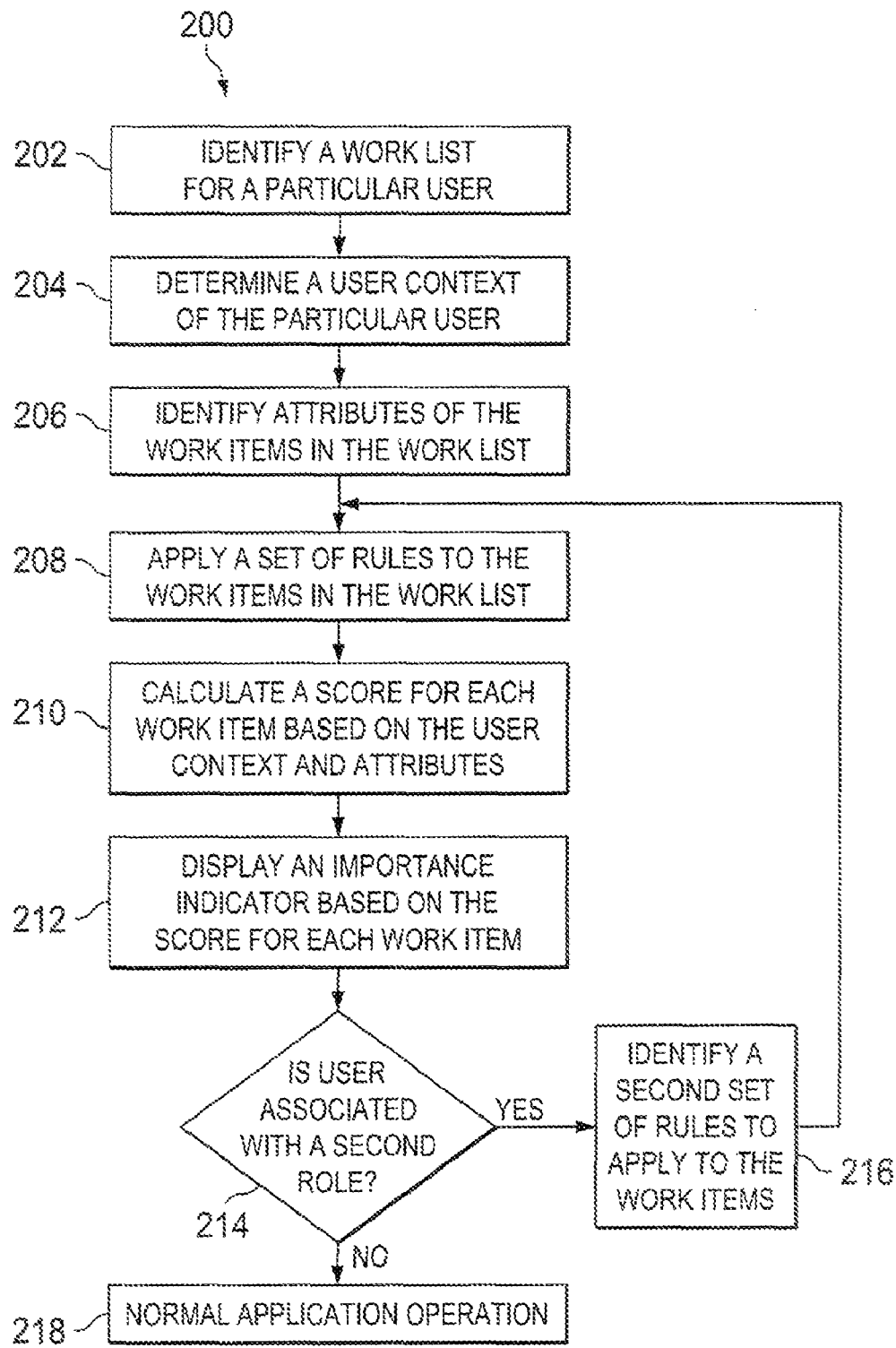
FIG. 2 illustrates a flowchart of an example process for determining an importance of a work item based on attributes of the work item and a particular user context using an appropriate system, such as the system described in FIG. 1.

FIG. 2 illustrates a flowchart of an example process 200 for determining an importance of a work item based on attributes of the work item and a particular user context. First, a work list comprised of work items 154 for a particular user is identified by the work item module 130 at 202. In some implementations, the work list may be a universal work list with federated tasks from different sources. For example, an e-mail application may federate tasks and e-mails from different sources and include them in an inbox for a user. The work items 154 in the work list may be tasks assigned to the particular user or other data objects associated with one or more business processes involving the user. Further, the work items 154 in the work list may be arranged in a particular order. Traditional sorting mechanisms, such as sorting by date, subject, or vendor, may be applied to arrange the work items 154 in a particular order. The work items 154 may need to be further filtered, however, for the user to identify the most important work items 154 to be addressed given the user's role or status.

In addition to determining importance of the work items 154 based on attributes such as date, subject, or vendor, a work list manager may, for example, determine importance based on other context information associated with the user or a role of the user in a particular business context. Thus, a user context of the particular user is determined at 204. The user context of a particular user includes attributes associated with the user that provide an indication of what types of work items may be important to the user for a particular situation. The attributes can include the user's role within an organization, the user's role for a certain project, the user's context for a particular session, the user's involvement in a particular task or project, personal settings of the user that indicate the user's preferences in general or with respect to particular tasks, a history of the user's previous actions or work habits, a geographical location of the user relative to the location of other users associated with the work item, the user's recent communications with other members of the organization, the most frequently performed tasks of the user, and other attributes associated with the user.

Still further, a context for a particular user may be determined at least in part by the attributes, actions, or context of other users. For example, a user having a particular role within a business organization or a business process may share certain attributes with other users having the same role within the same business organization or with other organizations. Accordingly, contextual information may be obtained from a community of users sharing similar attributes and applied to a particular user to determine a relevant context for the user.

Next, the attributes of the work items 154 in the work list are identified at 206. These attributes may be any aspect of the work items 154 that may be beneficial to determining the importance of each work item. For example, a particular work item may be a data object defining a task assigned to the user. In some instances, the number of other assignees associated with the task may be an attribute of the work item that helps define the importance of the work item because a task assigned to only one user may be particularly important to that user while a task assigned to a group of users may be less important to any particular user in the group of users. The attributes of a work item that are identified can include, for example, any dates associated with the work item such as due dates or the date the work item was received, the names of other users associated with the work item such as other assignees or the creator of the work item, a particular task, project, or vendor associated with the work item, certain keywords in the work item, relevant information contained in any attachments to the work item such as file types of the attachments, other work items or tasks related to the particular work item, or other properties of the work item that may be used to determine an importance of the work item.

A set of rules can then be applied to the work items in the work list at 208. In general, the set of rules includes rules that define which attributes of the user context or the work items are applicable to determining the importance of the work item in a certain scenario, how the attributes affect the importance of a work item, and the different scenarios in which different attributes may affect the importance of a work item. For example, in certain instances, a rule may dictate that given a user associated with a particular role, the due date of a task associated with the work item and the number of assignees of the work item are the most important attributes to be used when determining an importance of a particular work item. Other attributes, however, may be weighed more importantly if the user is associated with a different role. In other words, the rules set parameters for how different attributes affect the determination of importance of the work items. In certain implementations, the applicable rules may be dynamic and flexible. Instead of ranking the work items in the work list based on a single, static attribute such as a due date or the creator of the work item, for example, the rules may account for multiple attributes used in different combinations depending on the situation. Abstract rules such as "if, then, else" rules may also be applied when determining importance of the work items. Further, some rules may be applied as "hard" rules that function as constraints limiting the analysis of work item importance to specific conditions. Some rules may also be applied as "soft" rules that function as preferences in the determination of work item importance in which a number of different factors may affect the importance of a particular work item. Still further, multiple rules may be divided into hierarchies, with some groups of rules having higher priority than other groups of rules. Moreover, the rules may be defined by the user or automatically generated based on a role of the user or on other parameters associated with the user.

Next, at 210, a score for each work item is calculated based on the rules applied to the work items. In some implementations, the score for each work item is a numerical value representing a relative importance of a particular work item with respect to other work items. The score for a work item may be an aggregation of points assigned to the work item for each attribute considered to contribute to the importance of the work item. Thus, work items with more attributes and properties considered to be important to a particular user in a particular role generally are assigned higher scores than work items with fewer such attributes. In other words, the work items can be rated for importance relative to other work items associated with a user rather than or in addition to sorting the work items according to a static property. Further, the score for a particular work item reflects the importance of the work item based on the set of rules applied to the work item. For example, the applicable rules for a particular work item may dictate that certain combinations of attributes indicate a work item with higher importance in a particular context. Accordingly, work items with the particular combination of attributes may be assigned higher scores. The rules may also define different combinations of attributes as having greater importance for different contexts, such as different user roles. The same user may access the work list under a different role, and the same work items may be assigned different scores due to the change in the user's role.

After each work item is assigned a score, an importance indicator for one or more of the work items is displayed to the user based on the score for each work item at 212. The importance indicator may be displayed for each work item in the work list or for only certain work items, such as work items that meet a threshold level of importance, for example. In general, the importance indicator is an additional property of a work item representing a relative importance of the work item. The importance indicator may be used by various components such as system agents, for example, for processing based on the importance of a work item. In some instances, the importance indicator can be visually depicted to a user using different styles, such as described in example FIG. 3 below. In certain implementations, the importance indicator may indicate a level of importance for each work item based on the scores generated for the work items. Accordingly, work item importance for a particular context may be divided into multiple levels, such as High Importance, Medium Importance, and Low Importance. For example, work items with scores in an upper range of values may be associated with an importance indicator of High Importance, work items with scores in an intermediate range of values may be associated with an importance indicator of Medium Importance, and work items with scores in a lower range of values may be associated with an importance indicator of Low Importance. As described above, the importance indicator for each work item may be personalized for a particular user's context within a business organization.

In some implementations, a different set of rules may be associated with a user for each different context of the user. For example, a user may be associated with more than one role within an organization. The user's roles may include roles within a business organization, a role specific to a particular task, or any other similar categorization of the user's various roles. Accordingly, the work item module 130 may determine if the user is associated with a second role at 214. If a second role associated with the user is not identified, or the user does not choose to view the work items in the second role, normal application operations resume at 218. If the user is associated with a second role, a different, second set of rules may be identified to apply to the work items at 216. In some instances, the user may change the selection of his current role, and the second set of rules is identified in response to a change in the user's selected role. The second set of rules may reflect different preferences set by the user or may be automatically generated based on the different requirements of the second role. The second set of rules may then be applied to the work items in the work list at 208 in order to calculate a score for each work item at 210 and to display an importance indicator for each work item at 212. In some instances, an importance indicator for two or more roles may be displayed concurrently. For example, two columns of importance indicators may be provided, with the importance associated with a first role provided in the first column, and the importance associated with a second role provided in the second column. In some instances, the user can interact with the presented information to sort the work items by a particular role or based on other criteria or information.

Figures 3, 4:
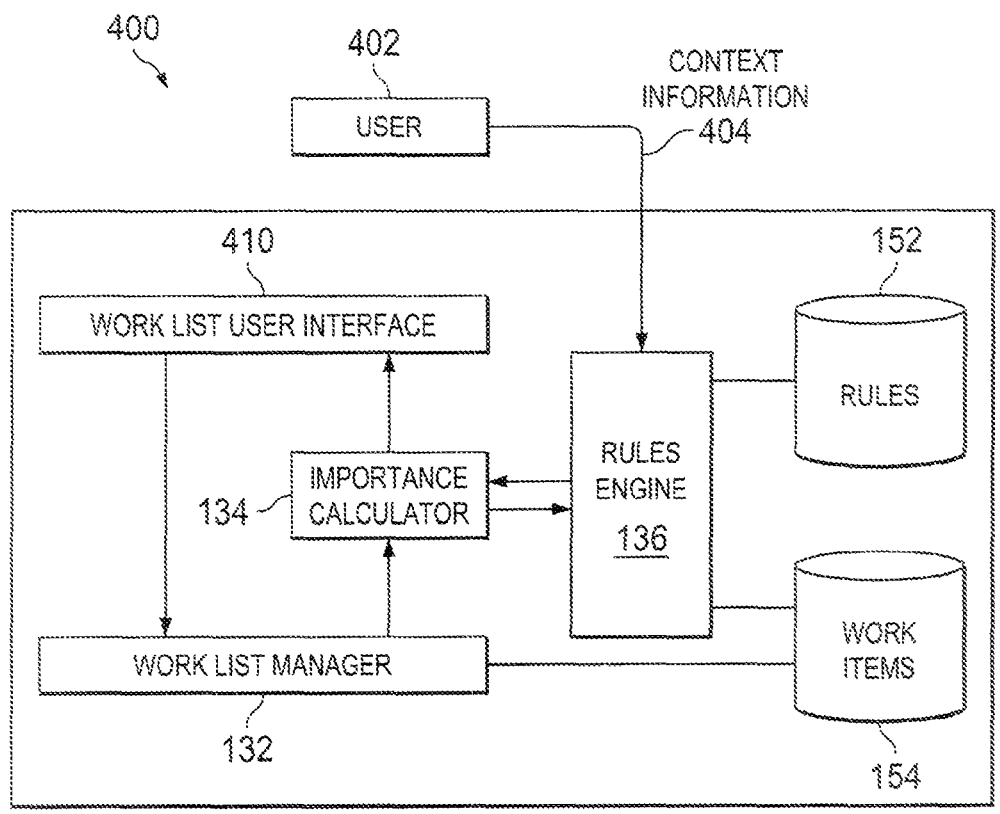
FIG. 3 illustrates an example screen shot of a user interface presenting work items and an indicator of an importance of the work items determined using an appropriate system, such as the system described in FIG. 1.
FIG. 4 depicts a diagram representing the interactions of example services and components used to generate importance indicators for work items using an appropriate system, such as the system described in FIG. 1.

For example, FIG. 3 illustrates an example screen shot 300 of a user interface presenting a work list of work items, each work item associated with a display of an importance indicator 308. The user interface may present information associated with each work item. In the illustrated example, the work items may be messages from different senders. Accordingly, the user interface displays a sender 302, a date 304, and a subject 306 for each work item. The importance indicator 308 may be presented using a graphical display such as a box with different shades of fill depending on the level of importance. For example, an empty indicator 308*a* may indicate that the work item has a relatively low importance, a partially shaded indicator 308*b* may indicate a work item of intermediate importance, and a fully shaded indicator 308*c* may indicate a work item of high importance.

FIG. 4 depicts a diagram 400 representing the interactions of example services and components used by the work item module 130 to generate importance indicators for work items. The work item module 130 may be configured to manage some or all of the services and components depicted in FIG. 4. An incoming work item such as an e-mail message may be received through a work list user interface 410. The work list user interface 410 may be a graphical user interface for receiving messages, requests, or work items directly from a user 402. In some implementations, the work list user interface 410 may also include an interface for communicating with and receiving work items and messages, such as e-mail messages, from other applications. After the message is received at the work item user interface 410, a request may be sent to a work list manager 132 to determine a relative importance of the work item. In general, the work list manager 132 may be any software module configured to display, arrange, process, or generally manage work items for one or more users 402. In some instances, the work list manager 132 may be communicably coupled to a repository such as memory 120, and the work item may be stored by the work list manager in the repository of work items 154.

The work list manager 132 may then communicate with an importance calculator 134 in response to the request to determine an importance of a work item. The importance calculator 134 can be operable to determine a relative importance of a work item by assigning a score to the work item, the score consisting of a numerical value representing the relative importance of the work item with respect to a particular user context. In certain implementations, the importance calculator 134 may access a rules engine 136 to determine the applicable personalized rules for a particular work item. As described above, the rules define parameters indicating the attributes and properties of the user and the work item that may be used to determine an importance of a particular work item. The rules engine 136 may access a set of rules 152 stored in a repository as well as obtain the required attributes of the work item from the repository of work items 154 to determine which rules apply to the work item and how the different attributes and user context affect the importance of the work item.

Further, the rules engine 136 may also be configured to obtain context information 404 associated with a particular user 402. For example, the rules engine 136 may determine a role of the user 402, the user's involvement in a particular task or project, personal settings of the user 402 that indicate the user's preferences in general and with respect to the type of tasks related to the present work item, a history of the user's previous actions or work habits, and the user's recent communications with other members of the organization. Based on the context information and work item attributes, the rules engine 136 may determine the applicable rules for a particular work item and send the rules to the importance calculator 134. The importance calculator 134 may then generate scores for the work items based on the rules. An importance indicator may be generated to indicate a level of importance for each work item based on the scores for the work items. The importance indicator may be presented through the work list user interface 410 for one or more of the work items, allowing a user 402 to efficiently identify important work items for the user's particular needs.

The preceding figures and accompanying description illustrate example processes and computer implementable techniques. But environment 100 (or its software or other components) contemplates using, implementing, or executing any suitable technique for performing these and other tasks. It will be understood that these processes are for illustration purposes only and that the described or similar techniques may be performed at any appropriate time, including concurrently, individually, or in combination. For example, although the preceding description illustrates examples involving a context of a single user, implementations involving the determination of a context of a group of users are also within the scope of the present disclosure. In some instances, a group of users may have common roles, tasks, or characteristics that may be applicable to the determination of a relative importance of shared work items, for example. Further, although FIG. 4 and the accompanying description illustrate a process for determining an importance of a single work item as the work item is received, a process in which a plurality of work items in a work list, for example, are analyzed to determine relative importance of each work item with respect to the other work items in the work list is also within the scope of the present disclosure. In other words, the determination of the relative importance of work items may be performed on a continual basis after each work item is received or as a full analysis of a group of work items. In addition, many of the steps in these processes may take place simultaneously and/or in different orders than as shown. Moreover, environment 100 may use processes with additional steps, fewer steps, and/or different steps, so long as the methods remain appropriate.

In other words, although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A computer implemented method performed by one or more processors for providing an indicator of a relative importance of a work item, the method comprising the following operations:

identify at least one work item for determining a relative importance of the work item;
determine a context of a user associated with the work item, the context identifying a role associated with the user;
identify a plurality of attributes of the work item;
identify at least one applicable rule from a set of rules specific to the user based at least in part on the determined context and the identified role associated with the user;
calculate a score for the work item based on an application of the at least one applicable rule to the context of and identified role associated with the user and the plurality of attributes of the work item, the score representing the relative importance of the work item for the determined context and identified role associated with the user; and
present an indicator of the relative importance of the work item through a user interface.

2. The method of claim 1, wherein the context of the user is associated with at least one of a role of the user within an organization, a role of the user for a particular task, personal settings of the user that indicate the user's preferences in general or with respect to particular tasks, a history of the user's previous actions or work habits, or the user's recent communications.

3. The method of claim 1, wherein the plurality of attributes includes at least one of a due date associated with the work item, a date the work item was received, a name of another user associated with the work item, a particular vendor associated with the work item, a number of other users associated with the work item, certain keywords in the work item, or other tasks related to the work item.

4. The method of claim 1, wherein the set of rules specific to the user defines at least one preference of the user.

5. The method of claim 1, wherein the user is associated with a plurality of roles and a different set of rules is associated with the user for each of the plurality of roles, and further wherein the context identifies a particular one of the plurality of roles associated with the user.

6. The method of claim 5, wherein the user is associated with a first role from the plurality of roles, and the method further comprising identifying a second role of the user from the plurality of roles and using a different set of rules to identify at least one applicable rule for calculating the score for the work item.

7. The method of claim 1, wherein the application of the at least one applicable rule includes identifying a specific combination of a particular attribute and a particular item of the context of the user to be used for calculating the score for the work item.

8. The method of claim 7, wherein calculating the score for the work item further includes assigning a numerical value to the work item for a presence of the particular attribute in the plurality of attributes.

9. The method of claim 1 further comprising identifying different levels of importance based on different ranges of scores and presenting a particular indicator for the work item based on a particular range of scores including the score for the work item.

10. A computer program product encoded on a non-transitory, tangible storage medium, the product comprising computer readable instructions for causing one or more processors to perform operations comprising:
identifying at least one work item for determining a relative importance of the work item;
determining a context of a user associated with the work item, the context identifying a role associated with the user;
identifying a plurality of attributes of the work item;
identifying at least one applicable rule from a set of rules specific to the user based at least in part on the determined context and the identified role associated with the user;
calculating a score for the work item based on an application of the at least one applicable rule to the context of and identified role associated with the user and the plurality of attributes of the work item, the score representing the relative importance of the work item for the determined context and identified role associated with the user; and
presenting an indicator of the relative importance of the work item through a user interface.

11. The computer program product of claim 10, wherein the context of the user is associated with at least one of a role of the user within an organization, a role of the user for a particular task, personal settings of the user that indicate the user's preferences in general or with respect to particular tasks, a history of the user's previous actions or work habits, or the user's recent communications.

12. The computer program product of claim 10, wherein the plurality of attributes includes at least one of a due date associated with the work item, a date the work item was received, a name of another user associated with the work item, a particular vendor associated with the work item, a number of other users associated with the work item, certain keywords in the work item, or other tasks related to the work item.

13. The computer program product of claim 10, wherein the user is associated with a plurality of roles and a different set of rules is associated with the user for each of the plurality of roles, and further wherein the context identifies a particular one of the plurality of roles associated with the user.

14. The computer program product of claim 10, wherein the application of the at least one applicable rule includes identifying a specific combination of a particular attribute and a particular item of the context of the user to be used for calculating the score for the work item.

15. The computer program product of claim 14, wherein calculating the score for the work item further includes assigning a numerical value to the work item for a presence of the particular attribute in the plurality of attributes.

16. The computer program product of claim 10 further comprising:
identifying a change in the context of the user, the changed context associated with a different role associated with the user;
identifying at least one new rule from the set of rules specific to the user based at least in part on the changed context and the different role associated with the user; and
calculating a revised score for the work item based on an application of the at least one new rule to the changed context and the plurality of attributes of the work item, the revised score representing the relative importance of the work item for the changed context and the different role associated with the user.

17. A system, comprising:
memory operable to store work items associated with a user and a set of rules specific to the user; and
one or more processors operable to:
identify at least one work item for determining a relative importance of the work item;
determine a context of the user, the context identifying a role associated with the user;
identify a plurality of attributes of the work item;

identify at least one applicable rule from the set of rules specific to the user based at least in part on the determined context and the identified role associated with the user; and calculate a score for the work item based on an application of the at least one applicable rule to the context of and identified role associated with the user and the plurality of attributes of the work item, the score representing the relative importance of the work item for the determined context and identified role associated with the user.

18. The system of claim 17, wherein the context of the user is associated with at least one of a role of the user within an organization, a role of the user for a particular task, personal settings of the user that indicate the user's preferences in general or with respect to particular tasks, a history of the user's previous actions or work habits, or the user's recent communications.

19. The system of claim 17, wherein the plurality of attributes includes at least one of a due date associated with the work item, a date the work item was received, a name of another user associated with the work item, a particular vendor associated with the work item, a number of other users associated with the work item, certain keywords in the work item, or other tasks related to the work item.

20. The system of claim 17, wherein the one or more processors are further operable to determine a change in a role of the user and identify a different rule from the set of rules for calculating the score for the work item.

* * * * *